(12) United States Patent
Bielfeldt et al.

(10) Patent No.: US 6,328,843 B1
(45) Date of Patent: Dec. 11, 2001

(54) METHOD FOR PRODUCING BOARDS MADE OF WOOD-BASED MATERIAL AND SYNTHETIC BOARDS IN A CONTINUOUSLY OPERATING PRESS

(75) Inventors: Friedrich B. Bielfeldt, Pähl; Matthias Graf, Eppingen, both of (DE)

(73) Assignee: Maschinenfabrik J. Dieffenbacher GmbH & Company, Eppingen (DE)

( * ) Notice: Subject to any disclaimer, the term of this patent is extended or adjusted under 35 U.S.C. 154(b) by 0 days.

(21) Appl. No.: 09/373,534

(22) Filed: Aug. 13, 1999

(30) Foreign Application Priority Data

Aug. 13, 1998 (DE) .............................. 198 36 773

(51) Int. Cl.[7] ...................................... B32B 21/02
(52) U.S. Cl. .................. 156/311; 156/580; 264/109; 264/348
(58) Field of Search .................. 156/311, 580; 264/109, 348; 425/83.1

(56) References Cited

U.S. PATENT DOCUMENTS 4,334,468   6/1982   Guttinger ............................. 100/93

FOREIGN PATENT DOCUMENTS

2 058 820   3/1972   (DE) .
29 22 151   12/1980   (DE) .

Primary Examiner—Sam Chuan Yao
(74) Attorney, Agent, or Firm—Foley & Lardner

(57) ABSTRACT

A method for continuously producing finished board from a mat of a pressing stock mixed with a binder in a continuously operating press having steel belts, friction reducing elements, heating plates and cooling plates, the method comprising choosing a cooling length of a cooling section to cure the mat of pressing stock and to ensure a harmless vapor pressure within a finished board; introducing the mat between the steel belts of the continuously operating press; heating and pressing the pressing stock in a heating section of the continuously operating press; and cooling surfaces of the pressing mat just before the reaction starting temperature is reached, wherein the surfaces of the mat are subject to cooling when the temperature at the center of the stock is about 85% to 95% of the temperature required for curing the pressing stock. A continuously operating press for producing boards from a pressing stock has a press table and a press ram located above the press table. The press also has a first steel belt that is guided around the press table by a first drive roller and a first deflection roller and a second steel belt that is guided around the press table by a second drive roller and a second deflection roller. Heating and cooling plates are mounted to each of the press table and the press ram. The press also has a plurality of friction reducing elements between each of the first and second steel belts and the respective heat plates. The first and second steel belts transmit a pressing pressure and pull the pressing stock through the press. A pressing section of the continuously operating press is divided into a heating section and a cooling section such that the cooling section is variably extendable from the heating section with the cooling plates and the heating section is variably extendable from the cooling section with the heating plates.

14 Claims, 6 Drawing Sheets

METHOD FOR PRODUCING BOARDS MADE OF WOOD-BASED MATERIAL AND SYNTHETIC BOARDS IN A CONTINUOUSLY OPERATING PRESS

BACKGROUND OF THE INVENTION

1. Field of the Invention

The invention relates to a method for the continuous production of woodbased and/or synthetic boards and to a continuously operating press for producing such boards.

2. Description of Related Art

One such method for producing wood-based and/or synthetic boards is described in DE A 20 58 820, in which a heating and a cooling section are used within a continuously operating press. The special feature of the apparatus used in conjunction with that method is the gas-permeable and/or liquid-permeable perforated steel belts. A disadvantage with this method, and its corresponding continuously operating press, is that there is a fixed association between the heating and cooling zones within the pressing section. The perforated steel belts leave unwanted structured surface markings on the finished board; and the pointwise supply of steam and gas through the perforated steel belts does not allow uniform processing over the entire width of the press and in the mat of pressing stock.

One reason that this method and its corresponding continuously operating press have not gained general acceptance is that the heat stored in the rolling supporting elements, which are in the form of rolling rods and chain carpets, would have to be removed in the cooling section before the cooling action could take effect on the product. Another reason is that the system operates in a relatively sluggish manner with respect to the cooling effect and the board to be produced. In addition, energy efficiency is relatively poor, which results from the fact that the cost of materials used to produce the energy has risen disproportionately.

In the conventional production of wood-based materials using resin binders, which may be phenol or formaldehyde based for example, the moisture in the form of water introduced into the particle or fiber board is used as a heat transfer medium to the core of the mat or board through the transition of this moisture into the vapor state of aggregation. The reaction starting temperature of the binder or glue at the center of the board is reached at an earlier or later point along the pressing section depending on the thickness of the board. This aforementioned vapor pressure, which is still effective in the finished board at the end of the continuous pressing operation, is in equilibrium or disequilibrium with the transverse tensile strength produced in the board by the curing process. If, for example, the production rate in the continuously operating press is too high, the board is destroyed as it leaves the continuously operating press as a result of vapor rupture which is caused by the disequilibrium of a board in which the glue has not yet completely set and the increased action of the vapor pressure.

One disadvantage of this continuously operating pressing method, which does not have an additional cooling zone, is that ruptures may result from excess vapor pressure acting in the hot board. A devaporization effect within such a continuously operating press may be achieved by utilizing a pressing-steam or pressing-pressure relief section. This additional processing section, however, is disadvantageous, because steam escapes as a result of the pressure drop introduced relative to the atmosphere outside the continuously operating press. For example, moisture ($H_2O$) in a range of from 2% to 3% is removed from the board, which has an unfavorable effect with respect to the swelling behavior and hence usefulness of a wood-based board, especially in climatic zones having high percentage atmospheric humidity.

Although the cooling action described in DE A 20 58 820 reduces the effective vapor pressure, allowing production with higher product reliability, it is associated with the economic disadvantage that there is only one fixed optimum operating point for production.

As disclosed in DE A 29 22 151, the use of separate arrangements for the heating and cooling zones has been preferred in industry. Each of these heating and cooling zones has independent circulation systems for the rolling support elements between the heating and cooling plates and the steel belts. One advantage of this arrangement is that each of these separate process areas uses energy quite efficiently. A disadvantage of such a continuously operating press, however, lies in the brief reduction in pressure towards zero $N/mm^2$ in the transition area between the return of the hot rolling support elements at the end of the heating section and the inlet of the cold rolling support elements at the beginning of the cooling section. This can be critical, particularly in the case of slow transport speeds in the production of thick boards, because, in the case of wood-based boards, the vapor pressure in the core of the board bursts glued joints that have not yet set, i.e. the physical usage properties of the product are limited. Another serious disadvantage is the limitation to one optimum parameter setting, e.g. the production speed for a particular thickness of board.

This means, in general terms, that a system with fixed heating and cooling zones is uneconomical when used for a relatively wide range of widths in the production of thin (2.5 mm) boards to thick (38 mm) boards.

The difficulties suggested in the preceding are not intended to be exhaustive but are among many tending to reduce the desirability of known board production methods and known board pressing devices. Other noteworthy problems may exist; however, those presented above should be sufficient to demonstrate that those known methods and apparatuses are amenable to worthwhile improvements.

SUMMARY OF THE INVENTION

Accordingly, it is therefore a general object of the invention to provide a method and a continuously operating press for producing fiber-reinforced polymer compositions that will obviate or minimize the above described difficulties.

It is a specific object of the invention to provide a method and a continuously operating press in which the heating and cooling process on and within the mat of pressing stock can be controlled along the pressing section such that the overall efficiency is increased and the physical utility of the boards produced can be matched exactly to requirements.

It is another object of the invention to provide a method and a continuously operating press in which bursting is reduced by monitoring control/regulation of the vapor pressure.

A preferred embodiment of the method according to the invention intended to accomplish at least some of the foregoing objects includes choosing a cooling length of a cooling section to cure the mat of pressing stock and to ensure a harmless vapor pressure within a finished board; introducing the mat between the steel belts of the continuously operating press; heating and pressing the pressing stock in a heating section of the continuously operating press; and cooling surfaces of the pressing mat just before the reaction starting temperature is reached, wherein the surfaces of the mat are subject to cooling when the temperature at the center of the stock is about 85% to 95% of the temperature required for curing the pressing stock.

A preferred embodiment of the continuously operating press according to the invention that is intended to accomplish at least some of the foregoing objects includes a press table; a press ram located above the press table; a first steel belt that is guided around the press table by a first drive roller and a first deflection roller; a second steel belt that is guided around the press table by a second drive roller and a second deflection roller; heating and cooling plates mounted to each of the press table and the press ram; a plurality of friction reducing elements between each of the first and second steel belts and the respective heat plates; wherein the first and second steel belts transmit a pressing pressure and pull the pressing stock through the press; and wherein a pressing section of the continuously operating press is divided into a heating section and a cooling section, the cooling section being variably extendable from the heating section with the cooling plates and the heating section being variably extendable from the cooling section with the heating plates.

Additional objects and advantages of the invention will be set forth in the following detailed description, or may be learned by practicing the invention. The objects and advantages of the invention may be realized and obtained with the instrumentalities and combinations particularly described herein.

BRIEF DESCRIPTION OF THE DRAWINGS

The accompanying drawings, which are incorporated in and constitute a part of the specification, illustrate a presently preferred embodiment of the invention and, together with the above general description and the following detailed description, serve to explain the principles of the invention.

DETAILED DESCRIPTION OF THE PREFERRED EMBODIMENTS

Figure 1:
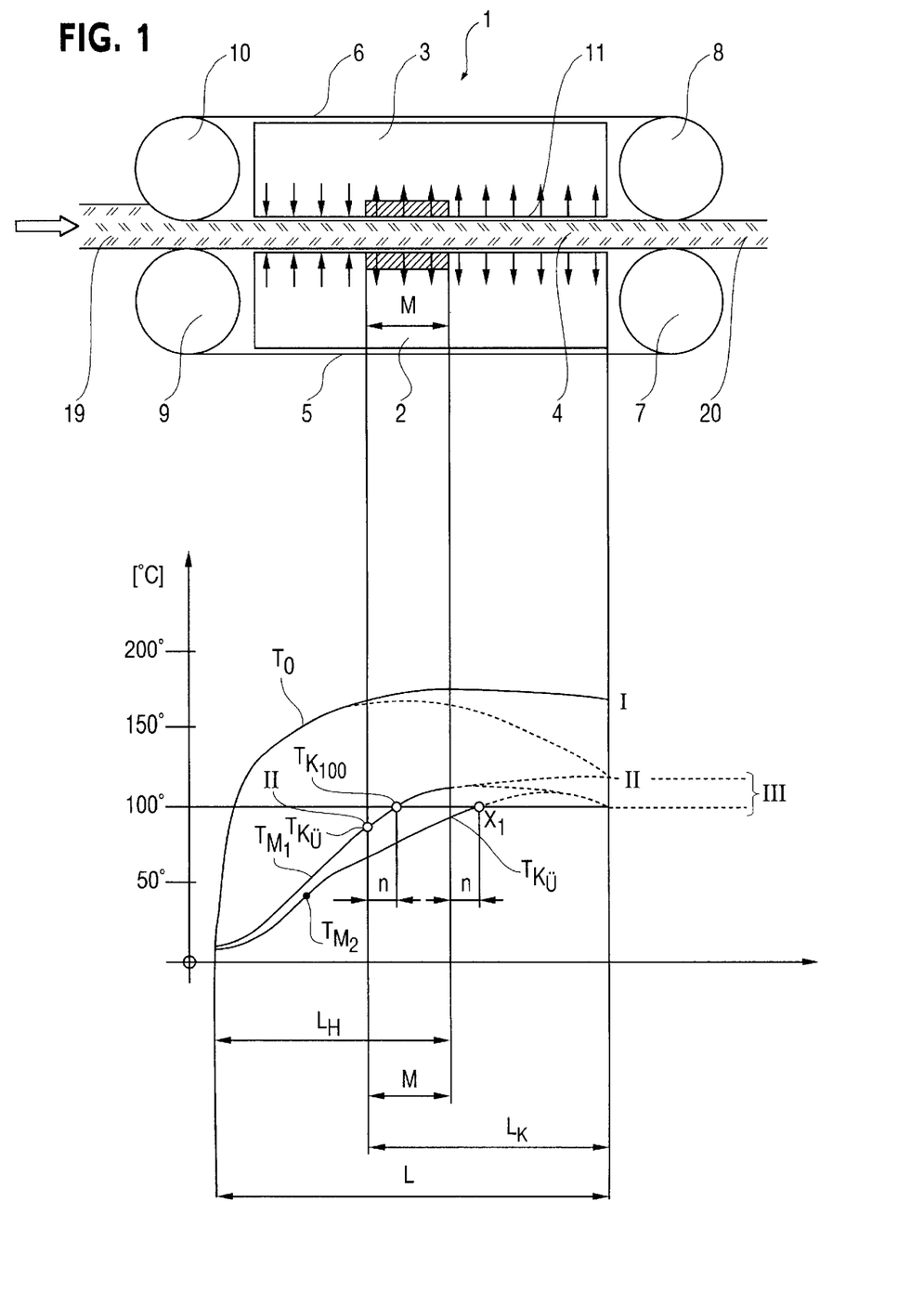
FIG. 1 is a side view of a continuously operating press according to the invention and and shows the temperature profile within the heating and cooling section of the press with and without the use of the cooling means according to the invention.

Referring now to the drawings, and initially to FIG. 1, there will be seen a continuously operating press 1 according to the invention comprising a press table 2, a moving press ram 3, and vertical ties for connecting the press ram 3. To adjust the press nip 4, the press ram 3 is moved up and down preferably with a plurality of hydraulic piston-cylinder arrangements and then locked in the chosen position. A steel belt 5 is guided around the press table 2 by a drive drum or roller 7 and a deflection drum or roller 9. A steel belt 6 is guided around the press ram 3 by a drive drum or roller 8 and a deflection drum or roller 10. A press heating plate 11 is mounted to each of the press table 2 and the press ram 3.

The diagram in FIG. 1 shows the temperature curve over the entire length of the pressing section L at the surface $T_O$ of the pressing stock 19 and at the center $T_{M1}$ of a thin pressing stock 19 and at the center $T_{M2}$ of a thick pressing stock, between the heated or cooled steel belts 5 and 6. Between points $X_1$ and $X_2$, the temperature at the center of the pressing stock 19 reaches $T_M \approx 100°$ Celsius for particle boards and reaches $T_M \approx 120°$ Celsius for OSB boards depending on the desired thickness d of the board. There is a variation along the pressing section L depending on whether thin board or thick board is being produced. The 100° Celsius $T_M$ point for particle boards corresponds to a temperature of about 120° Celsius for the temperature at which the binder in OSB phenolic-resin glue starts to react.

Figure 5:
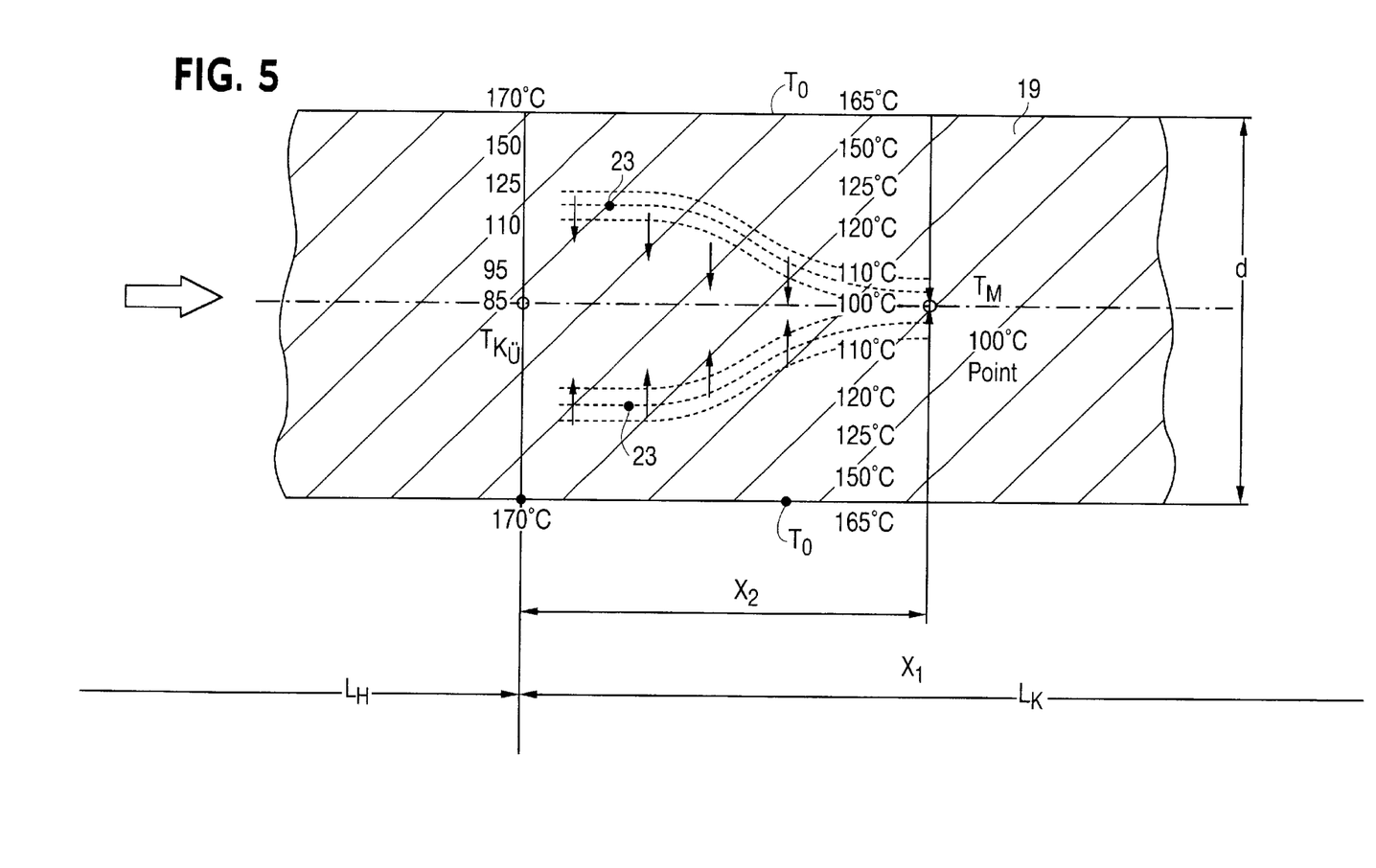
FIG. 5 shows a temperature profile within the thickness of the mat of material to be pressed, with preliminary section M.

Because the steel belts 5 and 6 are heated from about 200° Celsius to 240° Celsius, the water in the cover layers of the pressing stock 19 vaporizes and, as a result of a deliberately introduced pressure gradient, migrates from the cover layers to the center of the board, where a steam pressure wave 23 in accordance with FIG. 5 develops in the direction of the center of the board. Ahead of this steam-pressure wave 23, the temperature $T_M$ at the center of the pressing stock increases steadily due to heat conduction by the moist pressing stock 19. As a result of the steadily rising heat content within the pressing stock 19, the heating can be terminated before the core temperature $T_M$ of 100° Celsius or 120° Celsius is reached, this corresponding to the partial feed section n. This means that, when the supply of thermal energy stops, press cooling can be activated at reaction starting point $T_{K\ddot{U}}$ in accordance with feed section n. This reaction starting point $T_{K\ddot{U}}$ can be set in a variable manner as a function of the board thickness d and the particle/fiber glue mixture or permeability behavior of the particle/fiber geometry and the production rate, which is set as a function thereof. The greater the board thickness, the longer the feed section n before $T_{K\text{-}100}$ and $T_{K\text{-}200}$. On average, this value ($T_{K0}$) is about 85% to 95% of $T_{K\text{-}100}$ and $T_{K\text{-}200}$.

Figure 2:
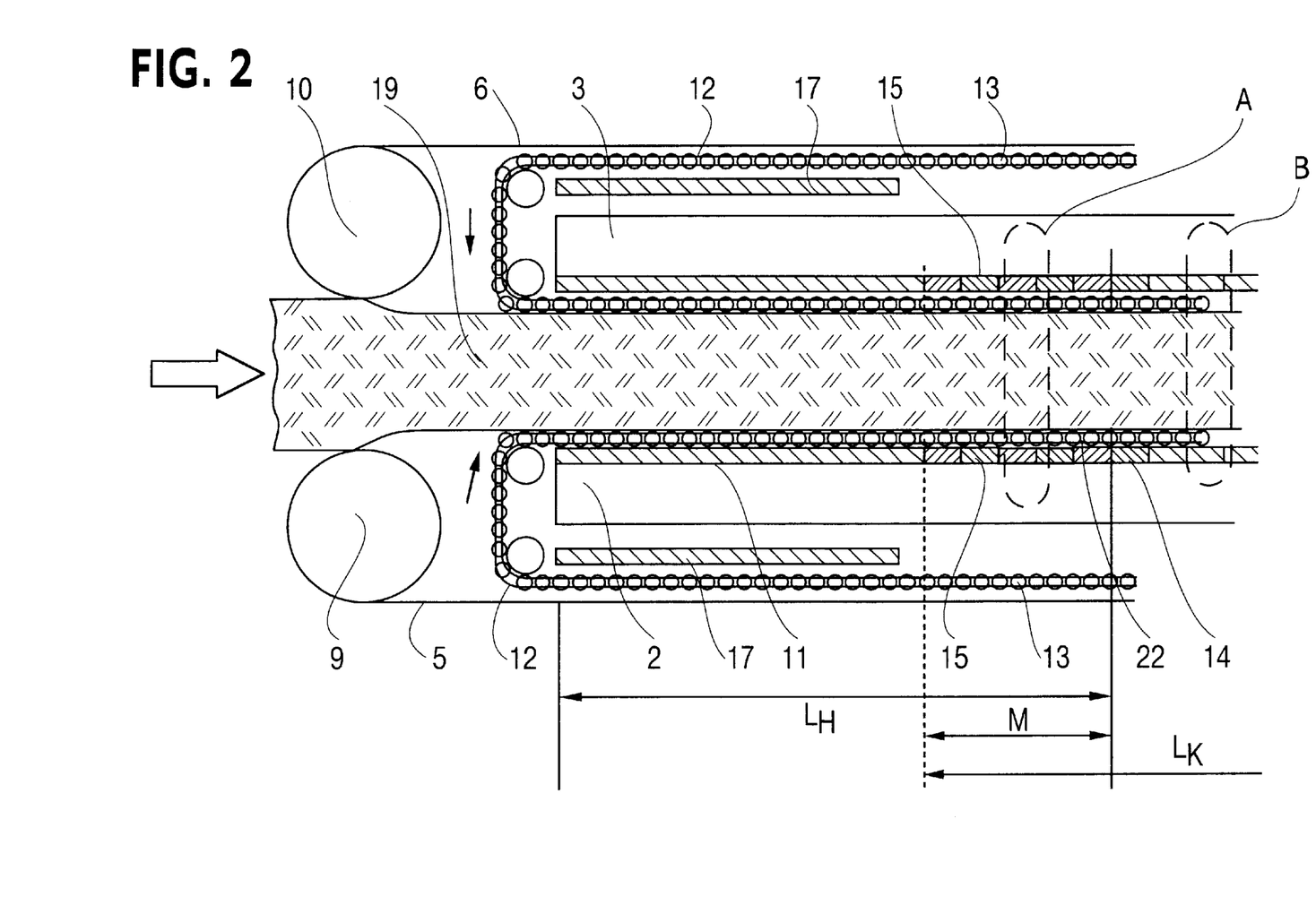
FIG. 2 shows part of the continuously operating press shown in FIG. 1, with the arrangement of the press plate cartridges and rolling rods or tubes.

As shown in FIG. 2, to reduce friction between the press heating plates 11 and the steel belts 5, 6, friction-reducing elements, preferably rolling rods 13, are provided. The axes of the rolling rods 13 extend transversely to the direction in which the belt runs. Each of the rolling rods 13 is joined at longitudinal sides of the press by guide chains 12 at a predetermined pitch and each is guided through the continuously operating press 1 by steel belts 5, 6. The guide chains 12 roll on the press heating plates 11 of the press ram 3 and the press table 2 and on steel belts 5 and 6.

Figure 3:
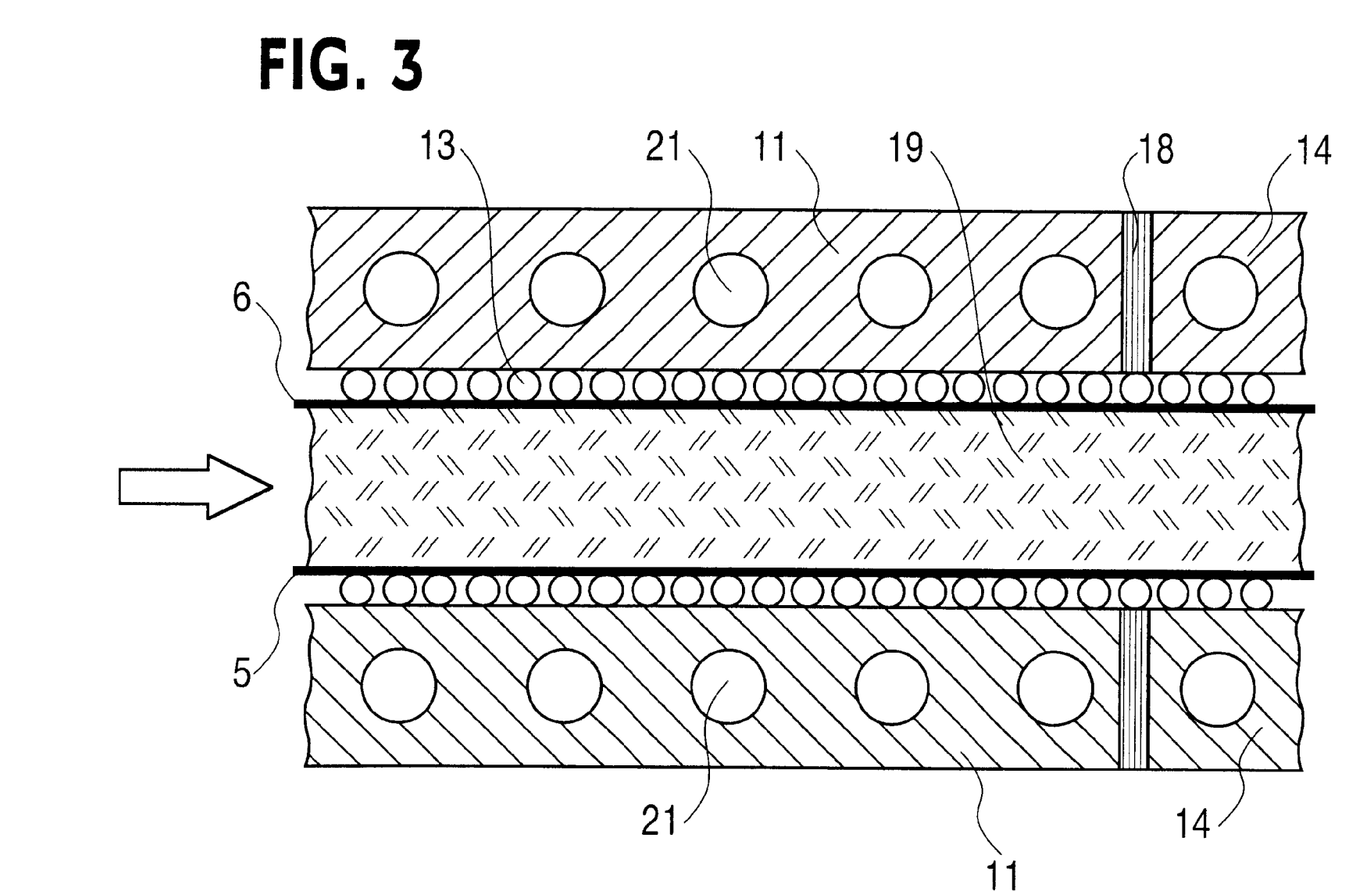
FIG. 3 shows a detail A of FIG. 2 showing the compression plate cartridges.

As shown in FIGS. 2 and 3, to be able to select the optimum start for press cooling or the reaction starting point $T_{K\ddot{U}}$ along the pressing section L, a plurality of compression plate cartridges 15 with component lengths in a range of from about 1 m to 2 m are provided within the potential selection range for the selectable section M. It is possible to supply the compression plate cartridges with heating or cooling media. An insulating strip 18 is provided between each of the heatable and coolable compression plate cartridges 15 as shown in FIG. 3. Oil or water may be used as the heating or cooling medium, although water is preferred because of its higher heat transfer coefficient, particularly in the cooling range.

Figure 4:
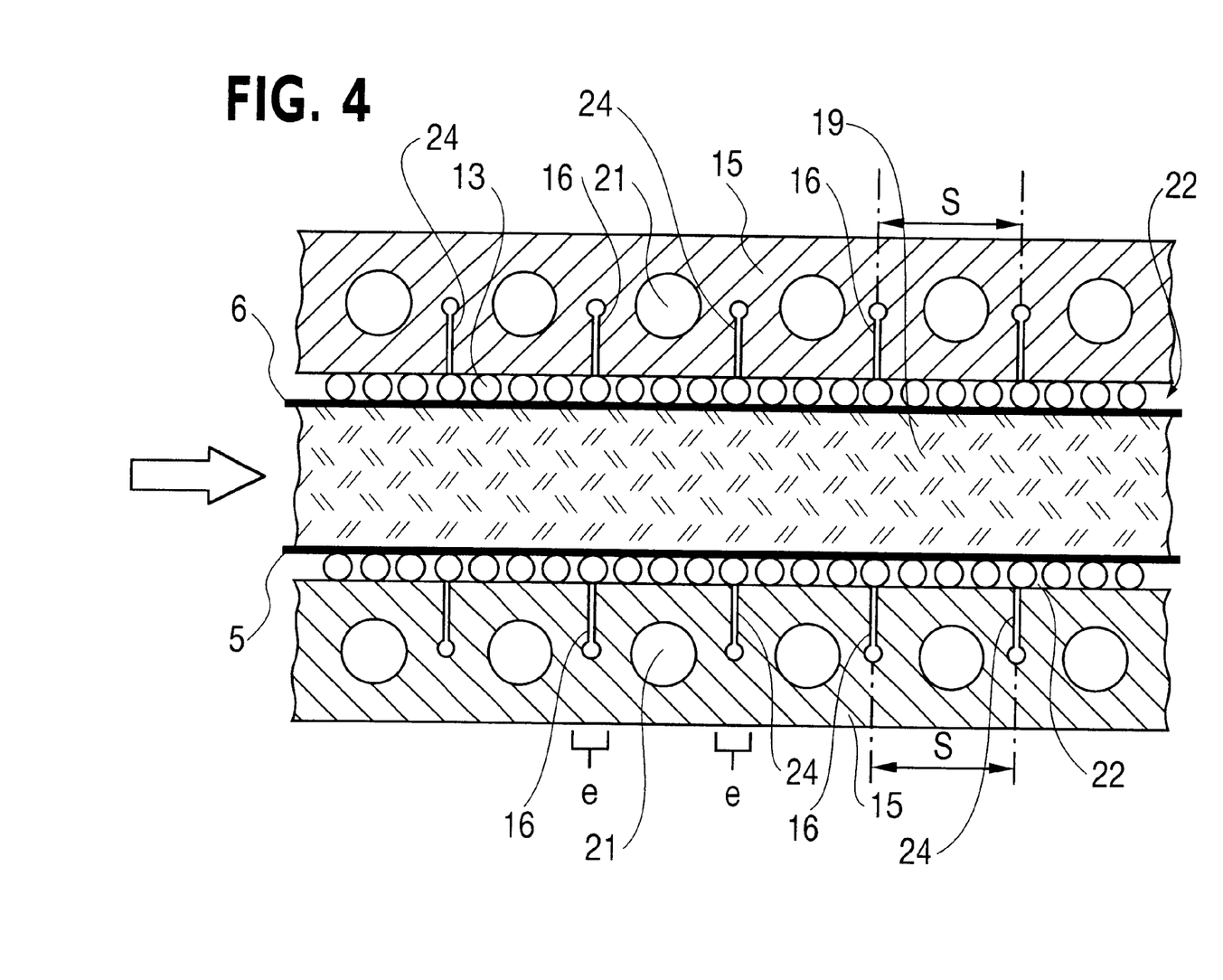
FIG. 4 shows, in a detail B, the design of the press cooling plates with water spraying/sprinkling device and steam extraction.

FIG. 4 shows structures of the continuously operating press for spraying or sprinkling water through vertical holes 16 in the compression plate cartridges 15. The structures are arranged in several rows e at a close spacing of preferably 50 mm to 150 mm across the width of the compression plate cartridges 15 between the heating and cooling holes 21. The structures lie transversely to the direction in which the steel belts 5, 6 pass. The water is sprayed over a wide area onto the rolling rods 13, which are at a temperature of about 220° Celsius, and the continuous hot steel belts 5 and 6, and the water is immediately vaporized. The heat stored in the rolling rods 13 and the steel belts 5, 6 is thereby removed abruptly by the enthalpy of vaporization effect, which results in a very rapid change in the temperature profile in the pressing stock 19, as is clearly illustrated by FIG. 5. According to FIG. 4, which is a detail B of FIG. 2, the steam pressure that arises is drawn off through a number of steam extraction holes 24, and the pressing stock 19 is thus not affected directly. Water can be added from a row e of holes 16 and steam extracted in alternation through a row e of holes 24.

Water can be supplied by the water-spraying and sprinkling device through the vertical holes 16 and cooling effected through the holes 21 along the cooling section $L_K$ until the temperatures at the rolling rods 13 and the steel belts 5, 6 have fallen to about $\geq 120°$ Celsius. This provides an assurance of controlled steam removal through the steam extraction holes 24, thus preventing condensation on the surfaces of the rolling rods 13, the compression/cooling plates 14, the compression plate cartridges 15, and the steel belts 5, 6 in the rolling region 22. An emulsifying effect with the film of lubricating oil on these surfaces is prevented and the lubricating function and operational reliability is maintained. The steam extracted is condensed in a water bath and fed back into the cooling process at about 95° Celsius. Oil molecules entrained by the steam collect at the surface of the water bath and are extracted or separated out from there.

Figure 6:
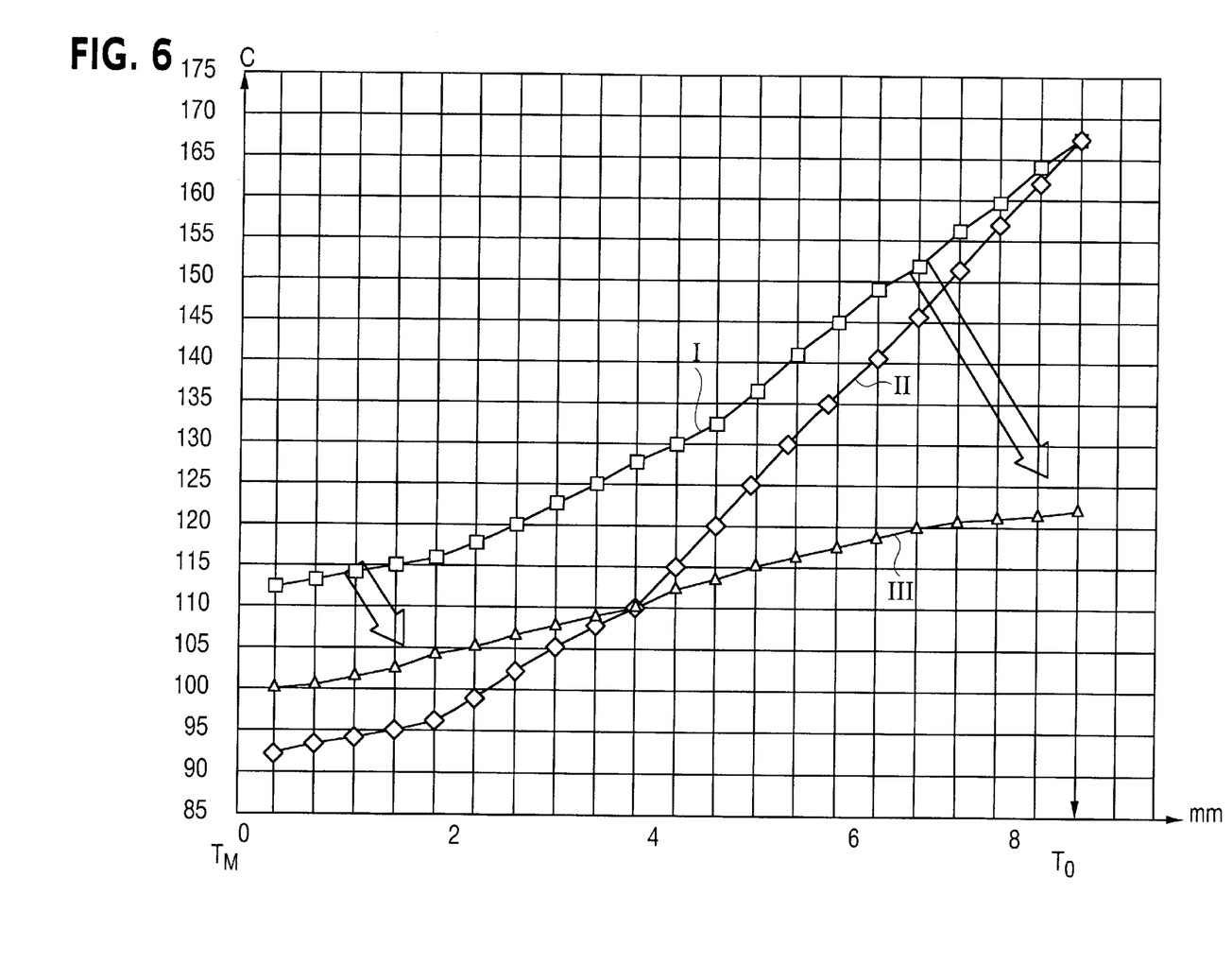
FIG. 6 shows the action of the cooling system according to the invention with reference to a 16 mm thick MDF board.

FIGS. 1, 5 and 6 illustrate the process-engineering possibilities for controlling the moisture profile and for reducing the pressing factor when employing cooling as described above. This is demonstrated with reference to an MDF board with a thickness of 16 mm, FIG. 6, on a pressing section of 38 m with a 7 m integral cooling section. The cooling changes the temperature profile at the surface of the board from 170° Celsius to $\approx 140°$ Celsius at the surface of the board and from 115° Celsius to 100° Celsius at the center of the board at the end of the 38 m pressing length in comparison with the process without cooling. After passing through the cooling section $L_K$, the center temperature $T_M$ of the compressed material has been reduced from about 115° Celsius to approximately $\geq 100°$ Celsius and the surface temperature $T_O$ of the pressing stock at the cover layers has been reduced from 170° Celsius to about 122° Celsius in comparison with the process without cooling. The temperature profile in accordance with curve II from the center of the board to the surface of the board has fallen in the direction of temperature profile III in comparison with curve I (without cooling).

In comparison with the center temperature $T_M \approx 115°$ Celsius at the core of the mat 19 of compressed material without cooling, the reduction in temperature to approximately 100° Celsius results in a drastic reduction in the vapor pressure within the MDF board to approximately $\leq 1.1$ bar absolute. This completely eliminates the risk of bursting in the finished board 20. After leaving the cooling section $L_K$, the rolling rods must be heated in a return heating device 17 prior to reentering the continuously operating press 1.

FIG. 2 also shows how the selectable section M the cooling section $L_K$ can be shortened by appropriate variable control of the number of compression plate cartridges 15 or how the heating section $L_H$ can be extended by deactivation.

According to the method, just prior to reaching the reaction starting temperature ($T_{100}$) or the reaction temperature of the binder for curing at the center of the pressing stock, that is after the temperature has risen to about 85% to 95% of the temperature required for the curing of the pressing stock at the center ($T_M$) of this stock, the surfaces of the mat of compressed material are subjected to cooling. The cooling section ($L_K$) has a length that is sufficient for curing the mat of pressing stock and for a predetermined harmless vapor pressure within the finished board.

Contrary to the previous and prevailing opinion, according to the invention, the cooling pressure for reducing the vapor pressure in the interior of the mat of pressing stock is started not after the curing process is complete across the cross section of the board, but with the cooling at the surfaces of the mat of pressing stock, even before 85% to 95% of the reaction temperature, necessary for curing, of the binder used at the center $T_M$ of the pressing stock. Thus, due to the steadily increasing heat content within the pressing stock, the heating of the partial pressing section is switched off even before the curing temperature of the respective binder used has been reached at the center $T_M$ of the pressing stock or core temperature $T_{M100-120}$, and, in accordance with the feed section n, the press cooling is switched on at the reaction starting point $T_{KU}$.

According to the invention, this reaction starting point $T_{KU}$ can be set variably within the selectable section M as a function of the thickness of the pressing stock, the particle/fiber-glue mixture or the plastic used and the permeability behavior of the particle, fiber or granule geometry and the production speed set for these. As a result, a greater overall efficiency is achieved with the method and the physical utility of the board produced meets the desired requirements in an adaptable manner, because the mechanical/technological properties of the individual cross-sectional areas can be influenced more effectively.

The controlled cooling process effects a reduction in the vapor pressure, eliminating the need for the insertion of a vapor-pressure relief section, which typically occupies 10% of the entire pressing section at the end of the pressing section, in comparison with the conventional continuously operating press. In other words, according to the invention, about 10% of the pressing section is available for use in achieving higher productivity. Because the risk of bursting in the finished board is excluded, the speed of the process in the continuously operating press can be increased by about 10% to 15% due to the lower vapor pressure at the end of the cooling section of the press. Hitherto, this was not possible due to the risk of bursting in the continuous process on the continuously operating press and, thus, it was necessary to operate with an additional safety factor to ensure reliability of production. Overall, this results in an increase in productivity of about 20% to 25%. This gain through rationalization can be exploited to the full in combination with the reheating of the rolling support elements as they return to the inlet.

The application of the invention to the process brings about a drastic reduction in the temperature of the steel belt and hence in the surface temperature of the pressing stock. This means that the binder (glue) in the cover layers is subjected to extremely high temperatures for a much shorter time period. The longer time periods at high temperatures had led previously to the decomposition (degradation) of the binder and thus to a reduction in the bending strength of the finished board and was generally compensated for by an excessive addition of binder. Because of the shorter times at high temperature, it is possible to achieve higher bending strengths or the same bending and transverse tensile strengths in the finished product with less glue or binder.

The controlled cooling of the steel belts in the cooling section of the press to 120° Celsius to a minimum of 100° Celsius has the further advantage that uncontrolled precuring of the cover layers of pressing stock cannot take place between the inlet and the pressing operation under a high pressure of about 3 to 5 N/mm² and a high temperature of ≧220° Celsius. This results in a further advantage of a reduction in the sanding allowance of about ≧20%.

In terms of plant engineering, the waste heat can be reused in the overall process in a particle (OSB) or fiber board plant by appropriate energy utilization methods, for example, the waste heat can be used to preheat the feed water for producing steam in preheating the mat of pressing stock, to preheat the feed water for the steam/drier units of the particle/fiber preparation, to heat media themselves, e.g. for heating the press heating zone, the rolling rods or rolling tubes for preheating during return. Energy efficiency remains approximately unchanged with efficiently used heat recovery processes of this kind.

These applications incentives based on this heat recovery resulted in new applications insights for the physical utility of the boards produced and for the production behavior of the continuously operating press itself. For example, the continuously operating press according to the invention includes a pressing section L that is divided into a heating section $L_H$ and a cooling section $L_K$, the cooling section $L_K$ being able to be extended variably from the heating section $L_H$ by means of selectable coolable compression plate cartridges 15 and, conversely, the heating section $L_H$ is thus designed so that it can be selected variably by way of extension from the cooling section $L_K$.

According to the method, the thermal energy supply is switched off at the end of the heating section $L_H$ of the press and, in accordance with the feed section n, the press cooling is switched on as the cooling section $L_K$ at the reaction starting point $T_{K\ddot{U}}$. In order to be able to input the optimum reaction starting point $T_{K\ddot{U}}$ between $X_1$ and $X_2$ in accordance with the differing position of $T_{K\text{-}100°\,C.}$ to $T_{K\text{-}200°\,C.}$ along the pressing section, the continuously operating press according to the invention for inputting the reaction starting point $T_{K\ddot{U}}$ includes a plurality of compression plate cartridges with component lengths in a range of 1 to 2 m that are fitted within the potential selectable section M. These cartridges can be selectively supplied with heating or cooling medium. Thermal insulation is placed between each of the heating or cooling cassettes.

Another advantageous development of the continuously operating press according to the invention lies in that vertical holes in several rows e are additionally made in the coolable compression plates of the cooling section $L_K$, across the width b of the compression plates, through which demineralized cold water can be forced through holes onto the friction-reducing elements and the steel belts and can be removed as steam from the rolling area over an extended area through holes arranged in the compression plates or to the side of the steel belts. Using the enthalpy of vaporization results in rapid cooling. The steam extracted is condensed in a water bath, this having the advantage that entrained oil molecules can be separated off at the surface of the water bath and the condensed water is fed back to the vertical spray holes in a closed circuit.

For this purpose, the friction-reducing elements may include rolling bars, rolling elements, or rolling tubes extending across the width of the compression plates. Because of their lower mass of steel, the use of tubes has the advantage that the stored heat is about 50% to about 30% less in comparison with the rolling rod and the energy dissipated in cooling is less.

The cooling according to the invention can also be used for particle/fiber boards in combination with a thermoplastic as the binder. Such combined materials, for example, wood and a thermoplastic in proportions of, for example, 75% to 50% wood chips or 25% to 50% thermoplastics, are preferably used in recycling methods. The fundamental advantage of the method lies in the use of cooling that can be set variably with respect to the pressing section and in that, after the thermal plastification of the thermoplast and the compressive forming of the mat of pressing stock under pressure where thermoplastic boards or boards made of wood-based material are used in combination with, for example, thermoplastic binders, the formed board is then hardened by an adaptable cooling effect, i.e., the point of the change in state from the plastically fluid to the solid state is thermally undershot and the board can thus be removed from the press, i.e. the finished board can leave the continuously operating press with its final thickness after the cooling section and boards made of wood-based material in combination with plastics can be produced, with the advantage in terms of applications of extremely low moisture adsorption.

Further advantages of the method and of the continuously operating press according to the invention include: depending on the proportions and the quantities, variable selection of the heatable and coolable compression plates is possible to adjust the plastification region or the hardening region, and the speed of production can be adjusted to an economical setting depending on the thickness of the board; with the use of the continuously operating press according to the invention, it is possible to dispense partially or completely with downstream thermal post-conditioning, that is, cooling by the use of, for example, star-type turners, which are very expensive; and there are significant reductions in plant investment costs with a smaller space requirement for a corresponding plant.

Summarizing, some of the technological advantages are as follows: because of the the cooling down of the compression plates at their surface to from 120° Celsius to 100° Celsius and the temperature $T_M \geq 100°$ Celsius at the center of the pressing stock, a higher final moisture content of the finished board in the range of 8 percent by weight can be set; the thickness of the board can be controlled more accurately because the post-shrinking effect is reduced by more than 50% and, furthermore, the sanding thickness is reduced by reduced pre-hardening of the steel belts, which are cooled in a controlled manner, and retention of the glue binding structure without disintegration due to temporary overheating.

The use of all the advantages of the method and the press as described above results in an overall increase in production over the prior art of approximately 20% to 25%.

Additional advantages and modifications will readily appear to those skilled in the art. The invention, therefore, is not limited to the specific details and representative devices shown and described herein. Accordingly, various modifications may be made without departing from the scope of the invention.

The priority document here, German patent application DE 198 36 773.2, filed Aug. 13, 1998, is hereby incorporated by reference.

What is claimed is:

1. A method for continuously producing finished board from a mat of a pressing stock mixed with a binder in a continuously operating press having steel belts, friction reducing elements, heating plates and cooling plates, the method comprising:

choosing a cooling length of a cooling section to cure the mat of pressing stock and to ensure a harmless vapor pressure within a finished board;

introducing the mat between the steel belts of the continuously operating press;

heating and pressing the mat in a heating section of the continuously operating press; and cooling surfaces of the mat just before the reaction starting temperature is reached, wherein the surfaces of the mat are subject to cooling when the temperature at the center of the mat is about 85% to 95% of the temperature required for curing the mat.

2. A method according to claim 1, further comprising feeding a cooling medium into a plurality of holes in the cooling plates of the continuously operating press.

3. A method according to claim 1, further comprising spraying cold water through a plurality of holes in the cooling plates onto the friction-reducing elements and the steel belts of the continuously operation press.

4. A method according to claim 1, further comprising supplying an equal amount of water through holes in the cooling plates of the continuously operating plates as steam can be produced and removed.

5. A method according to claim 1, wherein an amount of heat removed by cooling is supplied on the return by appropriate heating.

6. A method according to claim 1, further comprising:
introducing the removed steam into a water bath;
separating oil residues by suction at a surface of the water; and
feeding the condensed water back in a closed spray-cooling circuit.

7. A method according to claim 1, wherein the friction-reducing elements and steel belts are cooled to $\geqq 140°$ Celsius when the boards are made of a wood-based material and to $\geqq 120°$ Celsius when the boards are made of synthetic composite materials.

8. A method according to claim 1, wherein a cooling section of the continuously operating press can be connected and disconnected in a variable manner from a heating section.

9. A method according to claim 1, further comprising adjusting a moisture content of the finished board at an outlet from 0% to about 3% below a moisture content at the inlet.

10. A method according to claim 1, further comprising adjusting a moisture content of the finished board at an outlet so that it is equal to a moisture content of the mat at an inlet.

11. A method according to claim 1, further comprising recovering waste heat from the cooling step.

12. A method according to claim 11, further comprising preheating a feed water with the recovered waste heat to produce steam preheating of the mat.

13. A method according to claim 11, further comprising preheating a feed water with the recovered waste heat to heat drier units to prepare particles of the mat.

14. A method according to claim 11, further comprising using the recovered waste heat to heat heating plates of the continuously operating press.

* * * * *